United States Patent [19]

Peacock

[11] Patent Number: 6,162,531
[45] Date of Patent: *Dec. 19, 2000

[54] MARKING FLUIDS WITH REDUCED SOLVENT EVAPORATION

[75] Inventor: Fred Peacock, Norfolk, United Kingdom

[73] Assignee: Berol Limited, Norfolk, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 09/077,009

[22] PCT Filed: Sep. 24, 1997

[86] PCT No.: PCT/GB97/02594

§ 371 Date: Jul. 17, 1998

§ 102(e) Date: Jul. 17, 1998

[87] PCT Pub. No.: WO98/13433

PCT Pub. Date: Apr. 2, 1998

[30] Foreign Application Priority Data

Sep. 24, 1996 [GB] United Kingdom .................. 9619864

[51] Int. Cl.⁷ ...................................................... B32B 3/26
[52] U.S. Cl. .................................... 428/321.5; 428/321.1; 428/320.2; 106/31.93
[58] Field of Search ............................ 428/321.1, 320.2, 428/321.5; 106/31.01, 31.93, 31.08; 430/309, 300

[56] References Cited

U.S. PATENT DOCUMENTS

| 4,256,494 | 3/1981 | Yamamoto et al. ...................... 106/22 |
| 4,357,431 | 11/1982 | Murakami ................................ 523/161 |
| 4,525,216 | 6/1985 | Nakanishi ................................. 106/30 |
| 4,822,417 | 4/1989 | Kobayahi et al. ......................... 106/23 |
| 4,996,135 | 2/1991 | Toyama et al. .......................... 430/309 |
| 5,279,652 | 1/1994 | Kaufmann et al. . |
| 5,412,021 | 5/1995 | Nakanishi ................................ 524/523 |
| 5,980,624 | 11/1999 | Ichikawa .............................. 106/31.58 |

FOREIGN PATENT DOCUMENTS

| EP 0 584 735 A2 | 3/1994 | European Pat. Off. . |
| PCT/EP89/ 00321 | 3/1988 | WIPO . |
| WO 89/09247 | 10/1989 | WIPO . |
| PCT/GB97/ 00208 | 1/1997 | WIPO . |
| WO 97/27256 | 7/1997 | WIPO . |

OTHER PUBLICATIONS

The Merck Index, 11th Edition, p. 1107, 1989.

*Primary Examiner*—William Krynski
*Assistant Examiner*—Hong J. Xu
*Attorney, Agent, or Firm*—Foley & Lardner

[57] ABSTRACT

Marking instruments having an improved cap-off life are provided. The marking instruments include a marking tip and a marking fluid. The marking fluid includes at least one volatile solvent and a waxy additive dissolved in the solvent at a level of between 0.05% and 25% by weight. The waxy additive is dissolved at a level which is at least 20% of the amount required to form a saturated solution of the additive in the solvent at 20° C. The waxy additive has a melting point of at least 40° C. and is capable of forming a continuous solid skin over the surface of the marking fluid if the marking fluid is held in an open vessel which permits solvent evaporation from the surface of the fluid."

18 Claims, No Drawings

MARKING FLUIDS WITH REDUCED SOLVENT EVAPORATION

BACKGROUND OF THE INVENTION

1. Field of the Invention

The present invention relates generally to the field of coating fluids, such as those used in painting, in gluing and in stamp pads or marking pens. More specifically, the present invention relates to coating fluids which have reduced solvent evaporation rates when the fluids are held in open vessels, on a brush, in a porous stamp pad, an uncapped porous-tip pen or the like.

2. Description of the Prior Art

It is well-known that some liquids readily form skins on exposure to the atmosphere. This is especially common with viscous liquids such as adhesives, paints and starch-based culinary sauces. Processes which might contribute to the formation of skins include solvent loss, chemical reaction with either the oxygen or the water vapor of the atmosphere and migration of dispersed particles to the surface. It is also known that evaporation of water can be reduced by the presence of extremely thin layers of surface active materials.

Water based writing or colouring inks for use on paper commonly contain a co-solvent of low volatility which prevents the ink in the pen tip from drying out immediately. Among the liquid co-solvents commonly used are ethylene glycol, propylene glycol, diethylene glycol, glycerol and formamide. Sometimes the use of less common co-solvents such as thiodigol, propylene carbonate, hydroxethylformamide and 2-pyrrolidone might be justified. Deliquescent salts, such as sodium lactate, ammonium acetate, ammonium thiocyanate and lithium bromide can also act as low-volatility co-solvents. Furthermore, substances may be used which, although not normally liquid or deliquescent, form liquid or deliquescent mixtures with other ink components. Examples of these substances include urea, sorbitol, sulphonyldiethanol and ethylene carbonate. One drawback to inks containing such low-volatility solvent components is that they are very slow to dry on non-porous surfaces, such as films used with overhead projectors and like.

One method for formulating ink that dries quickly on non-porous surfaces but which, when used in marker pens, gives a longer "cap-off" life before the tip becomes dry is described in European Patent No. 0 359 805 (U.S. Pat. No. 5,279,652). This patent (hereinafter called the "Kaufmann, et al." patent) describes the use of certain soluble crystalline additives to make marking fluids which form a protective, but easily rupturable, layer on the surface of the fluid when contained in pens and the like. The crystalline additives are selected by a process which involves dissolving candidate materials alone in the solvent of the marker and filling the resulting solution into a pen fitted with a capillary writing tip. The pen is then left with the cap removed, and if outward growing crystals form at the tip, the additive is likely to induce such layer formation.

In the examples given in the Kaufmann, et al. patent several mechanisms may contribute to the claimed increase in cap-off life. However, an indication of what is likely to be important is provided in a description of one of its particularly preferred embodiments. In this experiment, an aqueous solution of a resin was placed in one pen with a capillary tip and a ten percent (10%) solution of crystalline solid urea was placed in a second pen. When left uncapped, the tips of both pens dried quickly, but when a mixture of the two solutions was tried in a third pen, a satisfactory cap-off life was obtained.

Marker pens with porous tips and inks which incorporate crystalline additives selected as specified in the Kaufmann, et al. patent are now on the market. In view of the observations made in the experiment described in the previous paragraph, it may be hypothesized that the inks form a protective layer in two stages. Firstly, solvent is lost from the surface of the ink in the outer pores of the tip, causing fine crystals of the additive to form in those pores. The effect is to produce a surface layer of much finer capillarity, which greatly reduces the rate of solvent exchange between the surface region and the ink below. In the second stage, as more solvent evaporates from the liquid surface, the binding resin, colourant and possibly other components are deposited and these cement the additive crystals to form a composite surface layer. Because the additive and colourant are intrinsically weak, this layer is easily ruptured during normal writing procedures.

It should be emphasized that this mechanism is hypothetical only, but it does represent a reasonable explanation of how the Kaufmann, et al. inks achieve the improvement in cap-off properties. The accuracy of such explanation does not affect the scope of the present invention.

A disadvantage of inks formulated in accordance with the Kaufmann, et al. patent is that the dried ink films do not have good gloss and they are not very transparent. Hence, the inks are not well suited for use as overhead projector pens or in similar applications. Furthermore, the Kaufmann, et al. inks do not normally form a protective layer when held in an open vessel.

Another commercially available additive which is sold by Multichem Ltd. of Hexham, England under the name "Cap Off Additive CA 210.2" and intended for use in alcohol-based marker inks, is said to be skin forming. It is a pasty solid at room temperature and substantially liquid at 40° C. This material has the advantage of permitting the formulation of inks which have good gloss and transparency while increasing the cap-off life of a pen. However, the improvement in cap-off life is modest, and because the additive is a semi-solid, the use of the material can adversely affect the adhesion and cohesion of the ink deposit.

Coating fluid formulations which have significantly increased cap-off life and which have good gloss and transparency would represent a significant advance in this technology.

FEATURES AND SUMMARY OF THE INVENTION

The present invention features coating fluids which are capable of developing a protective skin when held in an open vessel in contact with the atmosphere.

The present invention also features coating fluids which may be used for stamp pads, porous-tip pens, painting applications and the like, which fluids have reduced solvent evaporation rates.

A further feature of the present invention is that the coating fluids, when applied to non-porous substrates, can have excellent gloss and transparency.

Yet another feature of the present invention is that the inks and other coating fluids produce solid coatings on surfaces but do not dry out rapidly when held in open vessels or on a brush, stamp pad or in an uncapped porous-tip pen. Such coatings form a solid skin on the surface on exposure to the atmosphere reducing the rate of solvent loss.

Another feature of the coating fluid of the present invention is that the solid skin is easily rupturable, allowing the coating fluid to be applied quickly, with subsequent quick drying of the product on the surface to be coated.

Yet a further feature of the invention is that the solid skin is both easily rupturable and self-repairing.

How these and other features of the present invention are accomplished will be described in the following Detailed Description of the Preferred Embodiment. Generally, however, the features are provided by using wax-like soluble, solid additives. The additives are essentially waxy, although they may exist as fine powders or lubricous flakes. The coating fluids contain additives in an amount which, at room temperature, represents at least 20% saturation, and which typically represents between 0.05%–25% by weight. The additives have a melting point of at least 40° C. and preferably at least 50° C. The additives are incapable of forming outward-growing crystals when tested in accordance with the-additive selection process described in the above-identified Kaufmann, et al. patent.

DETAILED DESCRIPTION OF THE PREFERRED EMBODIMENT

Before proceeding to a detailed description of the preferred embodiments, several general comments can be made about the applicability and the scope of the present invention.

First, the colouring matter useful in the present invention are those dyes and pigments which are well-known for use in coating fluids for paints, markers, pens, stamp pads and the like.

Second, the particular end-use application of the coating fluids of the present invention may be widely varied. For example, the colouring fluids may be applied to the final substrate by a brush or the coating fluid may be used in a stamp pad, in porous-tip pens commonly called markers, or for other applications, such as adhesive applications.

Third, the temperature coefficient solubility for the additive of the present invention should be low to prevent the coating fluid from partially solidifying at low temperatures and forming skins less readily at high temperatures. In particular, the solubility of the additive should show less than a 100% increase between 25° C. and 30° C. This requirement is more likely to be met by additives having a melting point of 50° C. or above, although some useful additives have melting points above 40° C.

In many embodiments of the invention, the ink or other fluid will contain a soluble resin in addition to the additive. It is also helpful if the additive component is selected such that it will not unduly plasticize such resin.

Fourth, mixtures of additives may be used or additives of the present invention may be used in conjunction with crystalline additives such as those described in the Kaufmann, et al. patent.

Fifth, the additive should be used in an amount representing at least 20% saturation, preferably between 40% and 95%. Typically, this will result in the amount of the additive in the fluid being between about 0.05% and 25% by weight. Preferably the amount is 0.1%–5.0% by weight.

Solvents and solvent mixtures which may be employed in the present invention are listed in the Kaufmann, et al. patents, which disclosure is incorporated herein by this reference. These are blended with the wax-like additives described below and with other components known for making coating fluids.

Proceeding now to the description of the present invention, it has been found that adding "wax-like" (a term which will be used throughout the remainder of the specification and the claims) additives to solutions containing volatile solvents will lead to the formation of a thin, fragile skin. The resulting solution has greatly reduced rates of solvent loss by evaporation. For example, I first determined that adding about 0.2% of paraffin wax (congealing point about 55° C.) to either acetone or n-propanol produced a coating fluid which quickly developed a thin, solid skin and which dried very slowly when held in an open vessel exposed to the atmosphere. It was also discovered that higher levels of paraffin wax will cause a skin to form on other solvents, such as ethyl acetate, methoxyethyl ether, 1-methoxy 2-propanol and 1-methoxy 2-propyl acetate. The latter materials may be found in coating fluids useful for markers.

It has also been discovered that suitable coating fluids, according to the present invention, can be made by providing a solvent mixture of equal parts of water and isopropanol and adding either 0.2% stearyl alcohol or 0.9% palmitic acid thereto.

These discoveries led to the realization that a large number of solutes appear capable of producing skins on solutions containing the lower alcohols. Such solutes include zinc valerate, palmitic acid, stearic acid, stearyl alcohol, cholesterol and glycerol monostearate.

Other solutes which will produce skins on solutions in propanol are stearic acid, glycerol monostearate and cetyl palmitate. The following will produce skins on 1-methoxy 2-propanol: stearic acid, stearyl alcohol, distilled lanolin alcohols, glycerol monostearate and cetyl palmitate.

Cetyl palmitate will also form skins on solutions in methoxypropyl acetate, ethoxypropyl acetate, methoxyethyl ether, cyclohexanone and aliphatic petroleum spirits (boiling point 138° C. to 162° C.).

The foregoing list is intended merely to illustrate the range of systems which will produce the easily rupturable solid skin on coating fluids in open vessels and a more generic description for the additives is as follows:

Hydrocarbon waxes, poly(ethylene glycol) waxes, monocarboxylic aliphatic acids containing 12 to 22 carbon atoms, amides of the aforementioned aliphatic acids, solid esters of the aforementioned aliphatic acids, monohydric aliphatic alcohols containing 14 to 22 carbon atoms, cholesterol, distilled lanolin alcohols and salts of monocarboxylic aliphatic acids containing 4 to 18 carbon atoms.

Before proceeding to specific examples, it should also be mentioned that another advantage of the coating fluids of the present invention is that the flammability hazard of such fluids may be reduced due to the lower rate of release of flammable vapors.

EXAMPLES

The following examples illustrate specific coating fluids made according to the present invention and having reduced solvent evaporation rates.

Example 1

A fluid suitable for making permanent marks on many plastics was prepared according to the formulation:

| | |
|---|---|
| C.I. Solvent Black 7 | 8 g |
| Cyclohexanone | 92 g |

After stirring well, the mixture was filtered.

3% by weight of cetyl palmitate (Estol 3653 from Unichema Iberica S.A., Spain) was dissolved in one portion of the ink. Samples of the ink with and without the additive were placed in open dishes at room temperature. The sample containing cetyl palmitate soon started to form a skin, thereby reducing the rate of solvent loss to about 3% of that of the unmodified ink.

The skin was very easily broken so that the ink was constantly available for application by a brush or other means.

Example 2

An ink was made to the following formulation:

| | |
|---|---|
| C.I. Basic Violet 1 | 3.5 g |
| 1-Methoxy-2-propanol | 89 g |
| Colophony resin | 3 g |
| Water | 4.5 g |

When all the components were fully dissolved, 2.5% by weight of stearyl alcohol (Crodacol S95 EP, from Croda Chemicals Ltd., Goole U.K.) was dissolved in one portion of the ink. Samples of the ink, with and without the additive, were placed in open dishes at room temperature. The sample containing the stearyl alcohol formed a thin coherent skin in about 40 minutes thereby reducing the rate of solvent loss to about 1%.

Portions of both inks were filled into stamp pads with the covers left open. When used to mark non-porous surfaces, the ink marks dried within a few seconds. After being left for about 30 minutes, the pad containing ink without the additive had ceased to function, whereas that with the additive was still working after about 5 hours exposure to the atmosphere.

Example 3

A fluorescent security fluid was made according to the following formulation:

| | |
|---|---|
| Uvitex OB | 0.7 g |
| Laropal A101 | 3.0 g |
| Methoxyethyl ether | 96.3 g |

Uvitex OB is a fluorescent dyestuff supplied by Ciba Geigy Pigments Division of Manchester, U.K. Laropal 101 is a synthetic resin supplied by BASF UK of Cheadle, U.K.

To one portion of the fluid was added 0.55% by weight of cetyl palmitate (Estol 3652).

When samples of the original and modified fluids were left in open dishes, a skin formed on the sample containing the additive in about 10 minutes, thereby reducing the rate of solvent loss by one order of magnitude.

Fibre-tip pens were filled with the two fluids and left uncapped. The tip of the pen containing the fluid without the additive dried in one day; that with the fluid containing the cetyl palmitate additive still wrote after 6 days.

Example 4

A marker ink was prepared according to the following formulation:

| | |
|---|---|
| C.I. Basic Yellow 37 | 2 g |
| C.I. Basic Blue 1 | 3 g |
| Cholesterol U.S.P., | 1 g |
| Colophony resin | 3 g |
| Methylated spirit 99% | 91 g |

Marks produced using an overhead projector marker pen filled with this ink were of good gloss and transparency. The cap-off life was approximately 4 days. This may be compared to a cap-off life of a few hours expected when using a similar ink without the cholesterol as additive.

Example 5

A marker ink was made according to the following formulation:

| | |
|---|---|
| Neopen Red 366 | 10 g |
| Kortacid 1895 | 1.5 g |
| Colophony resin | 2 g |
| Methylated Spirit, 99% | 86.5 g |

'Neopen Red 366' is a solvent dyestuff supplied by BASF U.K. of Cheadle, U.K. 'Kortacid 1859' is a grade of stearic acid supplied by Akzo Nobel Chemicals of Delfshaven, Netherlands.

When used in a fibre-tip pen, this ink gave marks of good gloss and transparency and a cap-off life of about 3 days, compared with a cap-off life of a few hours expected for an ink containing no stearic acid additive.

Example 6

A projector marker ink was made according to the following formulation:

| | |
|---|---|
| C.I. Basic Blue 7 | 3.5 g |
| Crodacol S95 EP | 2 g |
| Colophony resin | 2 g |
| Methylated spirit 99% | 92.5 g |

'Crodacol S95 EP' is a grade of stearyl alcohol from Croda Chemicals Ltd., Goole, U.K.

When used in an overhead projector marker pen, this ink gave marks of good gloss and transparency. The pen had a cap-off life of over one week, compared with a cap-off life of a few hours obtained using a similar ink and no additives.

Example 7

A solvent-based adhesive which was fast drying, of low toxicity and which was readily soluble in water, even when dry, was prepared by dissolving Luviskol VA64 (a synthetic resin available from BASF U.K. of Cheadle, U.K.) in an equal weight of acetone.

To one portion of this adhesive was added 0.18% of paraffin wax with a congealing point of about 55° C. (from Aldrich Chemical Co., Dorset, U.K.).

Both adhesives were found suitable for bonding paper but after being held in an open dish exposed to the atmosphere for 1 hour, the unmodified adhesive had developed a thick tough skin, whereas the adhesive containing the paraffin wax additive had only a thin, easily ruptured film and remained ready for use.

The term "wax-like additive" as used throughout this specification and as used in the claims which follow, shall refer to additives that do not form outward-growing crystals when tested in accordance with the additive selection procedure of the Kaufmann, et al. patent, which have a melting point of at least 40° C. and which are capable of forming a skin on the surface of a fluid when dissolved therein and held in an open vessel or in a porous structure and exposed to the atmosphere.

The examples above illustrate the variety of applications for the coating fluids of the present invention, including the use thereof as adhesives, marker fluids, stamp pad fluids, paints and the like. A wide variety of other applications and combinations will appear to those skilled in the art after they have read the present specification. Such other modifications are deemed to fall within the scope of the present invention if they fall within the scope of the claims which follow.

What is claimed is:

1. A marking instrument comprising a marking tip and a marking fluid, the marking fluid being applied to a surface when the marking tip is placed in contact with the surface, the marking instrument having an improved cap-off life and wherein the marking fluid comprises at least one volatile solvent and a waxy additive dissolved in the solvent at a level of between 0.05% and 25% by weight and at a level which is at least 20% of the amount required to form a saturated solution of the additive in the solvent at 20° C., said waxy additive having a melting point of at least 40° C. and being capable of forming a continuous solid skin over the surface of the marking fluid if a quantity of the marking fluid is held in an open vessel which permits solvent evaporation from the surface thereof, the additive being selected from the group consisting of poly(ethylene glycol) waxes, monocarboxylic aliphatic acids containing 12 to 22 carbon atoms, amides of the aforementioned aliphatic acids, solid esters of the aforementioned aliphatic acids, monohydric aliphatic alcohols containing 14 to 22 carbon atoms, cholesterol, distilled lanolin alcohols, and salts of monocarboxylic aliphatic acids containing 4 to 18 carbon atoms.

2. The marking instrument of claim 1 wherein the waxy additive in the marking fluid is selected from the group consisting of palmitic acid, stearic acid, behenic acid, glycerol monoesters of lauric, myristic, palmitic and stearic acids, lauryl, myristyl, cetyl and stearyl esters of lauric, myristic, palmitic and stearic acids, cetyl alcohol, stearyl alcohol, cholesterol and zinc valerate.

3. The writing instrument of claim 1 wherein the waxy additive has a melting point of at least 50° C.

4. The writing instrument of claim 1 wherein the waxy additive is a monocarboxylic aliphatic acid containing 12 to 22 carbon atoms.

5. The writing instrument of claim 4 wherein the monocarboxylic aliphatic acid is selected from the group consisting of palmitic acid, stearic acid, behenic acid and mixtures thereof.

6. The writing instrument of claim 1 wherein the waxy additive is an amide of a monocarboxylic aliphatic acid containing 12 to 22 carbon atoms.

7. The writing instrument of claim 1 wherein the waxy additive is a solid ester of a monocarboxylic aliphatic acid containing 12 to 22 carbon atoms.

8. The writing instrument of claim 7 wherein the solid ester is selected from the group consisting of glycerol monoesters of lauric, myristic, palmitic and stearic acids and mixtures thereof.

9. The writing instrument of claim 1 wherein the waxy additive is a monohydric aliphatic alcohol containing 14 to 22 carbon atoms.

10. The writing instrument of claim 9 wherein the monohydric aliphatic alcohol is cetyl alcohol, stearyl alcohol or a mixture thereof.

11. The writing instrument of claim 1 wherein the waxy additive is cholesterol.

12. The writing instrument of claim 1 wherein the waxy additive is a distilled lanolin alcohol.

13. The writing instrument of claim 1 wherein the waxy additive is a salt of a monocarboxylic aliphatic acid containing 4 to 18 carbon atoms.

14. The writing instrument of claim 13 wherein the salt of the monocarboxylic aliphatic acid is zinc valerate.

15. The writing instrument of claim 1 wherein the waxy additive is dissolved in the solvent at a level of between 0.1% and 5% by weight.

16. The writing instrument of claim 1 wherein the waxy additive is dissolved in the solvent at a level which is at least 40% of the amount required to form a saturated solution of the additive in the solvent at 20° C.

17. The writing instrument of claim 1 wherein the solvent includes acetone, n-propanol, ethyl acetate, methoxyethyl ether, 1-methoxy-2-propanol, 1-methoxy-2-propyl acetate, ethoxypropyl acetate, cyclohexanone, aliphatic petroleum spirits, methylated spirit or a mixture thereof.

18. The writing instrument of claim 1 wherein the waxy additive has a solubility in the solvent which has less than a 100% increase between 25° C. and 30° C.

* * * * *

UNITED STATES PATENT AND TRADEMARK OFFICE
CERTIFICATE OF CORRECTION

PATENT NO. : 6,162,531

DATED : December 19, 2000

INVENTOR(S) : Peacock, Fred

It is certified that error appears in the above-identified patent and that said Letters Patent is hereby corrected as shown below:

In claim 1, at line 9, delete "20° C." and insert -- 20°C -- therefore.

In claim 1, at line 10, delete "40° C." and insert -- 40°C -- therefore.

In claim 8, at line 3, after "stearic acids" insert -- , lauryl, myristyl, cetyl and stearyl esters of lauric, myristic, palmitic and stearic acids --.

In claim 18, at line 3, delete "25° C." and insert -- 25°C -- therefore.

Signed and Sealed this

First Day of May, 2001

*Attest:*

NICHOLAS P. GODICI

*Attesting Officer*    *Acting Director of the United States Patent and Trademark Office*